United States Patent
Hoard et al.

(10) Patent No.: US 8,265,856 B2
(45) Date of Patent: *Sep. 11, 2012

(54) PRE-DELIVERY STRATEGY FOR DIESEL-ENGINE VEHICLES

(75) Inventors: John William Hoard, South Lyon, MI (US); William Charles Ruona, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/271,006

(22) Filed: Oct. 11, 2011

(65) Prior Publication Data

US 2012/0029791 A1 Feb. 2, 2012

Related U.S. Application Data

(63) Continuation of application No. 12/053,052, filed on Mar. 21, 2008, now Pat. No. 8,050,844.

(51) Int. Cl.
*F02D 41/30* (2006.01)
(52) U.S. Cl. ............... 701/103; 123/299
(58) Field of Classification Search .......... 701/103–105, 701/102, 115; 123/295, 299, 568.21
See application file for complete search history.

(56) References Cited

U.S. PATENT DOCUMENTS

| | | | |
|---|---|---|---|
| 5,142,479 A | 8/1992 | Poirier et al. | |
| 5,979,419 A | 11/1999 | Toyoda | |
| 6,964,256 B2 | 11/2005 | Kataoka et al. | |
| 7,048,891 B2 | 5/2006 | Kinugawa et al. | |
| 7,823,798 B2 | 11/2010 | Le Lievre | |
| 7,905,086 B2 * | 3/2011 | Fujino | 60/274 |
| 8,050,844 B2 * | 11/2011 | Hoard et al. | 701/103 |

FOREIGN PATENT DOCUMENTS

| | | | |
|---|---|---|---|
| EP | 1582714 A1 | 10/2005 | |
| JP | 08291729 A | * 11/1996 | |
| JP | 9049450 A | 2/1997 | |
| JP | 2001-227381 A | 8/2001 | |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A method to supply fuel to an engine of a vehicle is provided. The method includes adjusting a direct injection of fuel into a cylinder of the engine based on whether the vehicle is in a pre-delivery state. In one example, the method includes reducing an amount of fuel in a post injection to reduce cylinder bore wetting effects and lubricant dilution during the engine cold start. After pre-delivery, a normal post injection schedule may be used to reduce emissions.

16 Claims, 4 Drawing Sheets

PRE-DELIVERY STRATEGY FOR DIESEL-ENGINE VEHICLES

CROSS REFERENCE TO RELATED APPLICATIONS

The present application is a continuation of U.S. patent application Ser. No. 12/053,052 filed Mar. 21, 2008, now U.S. Pat. No. 8,050,844, issued on 1 Nov. 2011, the entire contents of which are incorporated herein by reference.

TECHNICAL FIELD

The present application relates to the field of emissions control in motor vehicles equipped with diesel engines.

BACKGROUND AND SUMMARY

Vehicle pre-delivery includes a phase that begins immediately after a vehicle is manufactured and ends when the vehicle is received by a customer, for example. In pre-delivery, vehicles may be driven out of the assembly plant, loaded onto transportation, and delivered to a dealer, where they may be moved between storage and sale lots repeatedly. In some cases, as many as 100 cold starts can occur prior to accumulation of significant mileage or complete vehicle warm-up.

In U.S. Pat. No. 5,142,479, for example, an approach is provided to reduce pre-delivery spark-plug fouling in a spark-ignition engine. Specifically, over-rich fuel-air mixtures used for reliable cold starting may cause an accumulation of carbon on the spark plugs when the engine is turned off before reaching normal operating temperatures. To reduce spark-plug fouling in a new vehicle subject to short engine run times, the enrichment value is reduced if the mileage is below 50 miles, if the coolant temperature is within set limits, and if the previous engine run time was shorter than a predetermined period of time.

The inventors herein have recognized inherent limitations in this approach, despite its potential value in reducing spark-plug fouling. In particular, other potentially degrading conditions in addition to spark-plug fouling may occur during pre-delivery, where reducing enrichment may have no effect, or worse, may cause other problems. For instance, post injection of fuel in direct injection engines may pose issues during pre-delivery. Post-injection may be used following a cold start to increase exhaust temperature, and while it may improve the NOX-reducing efficiency of an exhaust-aftertreatment device, it may also increase the rate of lubricant dilution by fuel due to cylinder bore wetting. Though the resulting risk of engine damage may be small during normal use of the vehicle, such risk may be magnified in series of frequent cold starts as occur before a new vehicle is received by a customer, such as during pre-delivery.

Therefore, in one approach, a method is provided to supply fuel to an engine of a vehicle; the method includes adjusting a direct injection of fuel into a cylinder of the engine based on whether the vehicle is in a pre-delivery state. In one example, the method includes reducing an amount of fuel in a post injection. In other examples, the method includes changing a timing of a post injection. In still other examples, the method includes changing an amount and/or a timing of a main injection of fuel, or suppressing a post injection.

By using a modified post injection schedule during pre-delivery, cylinder bore wetting effects may be reduced during the engine cold start. After pre-delivery, a normal post injection schedule may be used to reduce emissions during the engine cold start.

In accordance with this disclosure, pre-delivery may be identified in a variety of ways: based on a number of miles driven, a maximum vehicle speed, an engine run time, or combinations thereof, as examples. Further, a vehicle retailer may actuate a delivery-indicating signal once the vehicle has been delivered. Still other approaches may also be used.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
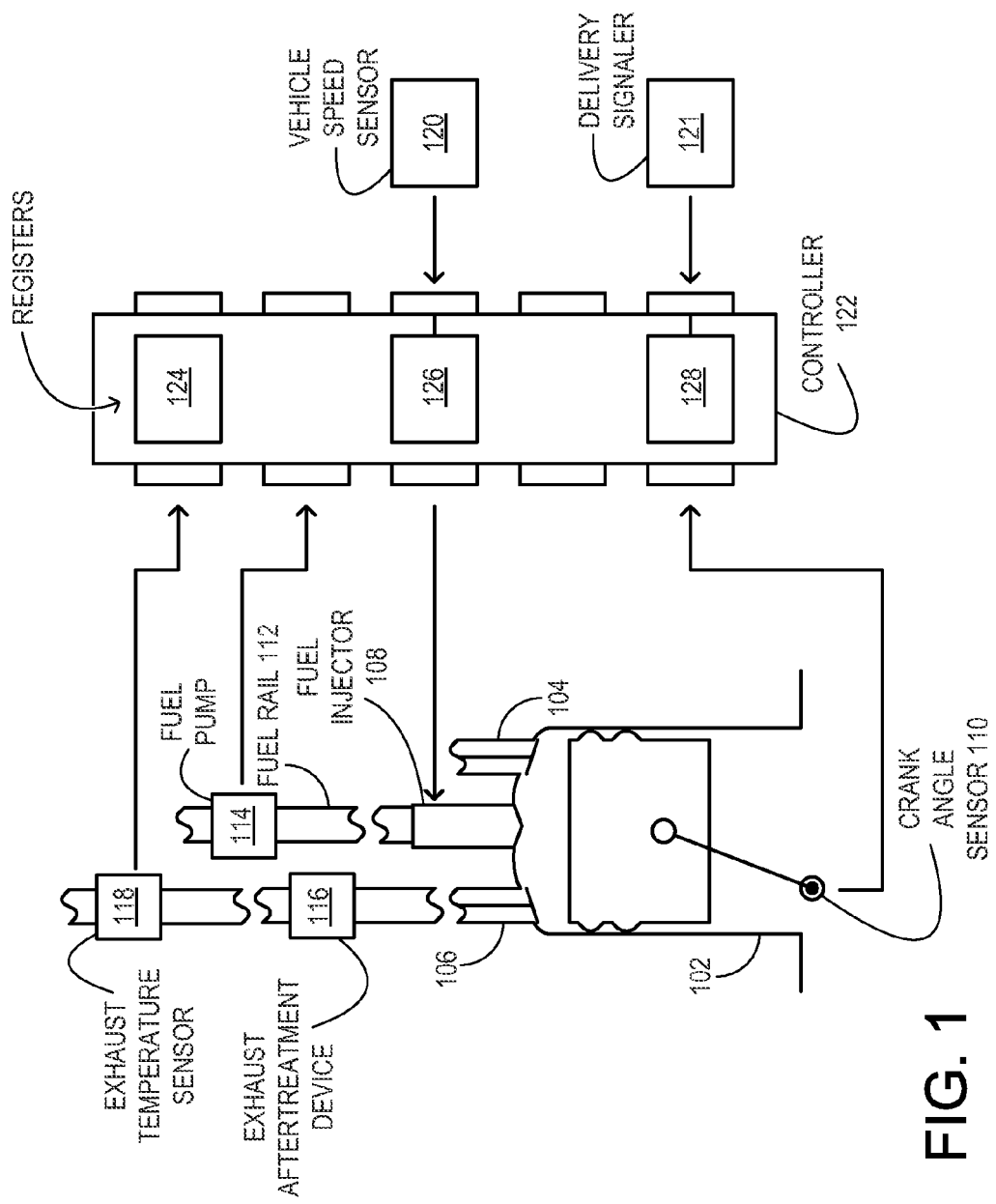
FIG. 1 shows an example configuration of components of a diesel-engine vehicle in accordance with the present disclosure.

FIG. 1 shows an example configuration of diesel-engine vehicle components in accordance with the present disclosure. FIG. 1 shows cylinder 102 with intake valve 104, exhaust valve 106, fuel injector 108, and crank-angle sensor 110. Cylinder 102 may be one of several cylinders in an engine of a vehicle. FIG. 1 also shows fuel rail 112 and fuel pump 114. In this example, at least some fuel enters cylinder 102 through fuel injector 108. Fuel is transmitted to fuel injector 108 through fuel rail 112. The fuel pressure in fuel rail 112 is maintained by fuel pump 114. Air enters cylinder 102 through intake valve 104. In some embodiments, fuel may enter the cylinder through the intake valve as well as the fuel injector. Thus, the configuration of components shown in FIG. 1 is intended to enable direct injection and arbitrary combinations of direct and port injection.

FIG. 1 shows exhaust-aftertreatment device 116, exhaust-stream temperature sensor 118, vehicle speed sensor 120, delivery signaler 121, and controller 122. Delivery signaler 121 may include a signaler such as a switch that a deliverer of the vehicle may actuate to signal that the vehicle has been delivered and is no longer in a pre-delivery state. Controller 122 is configured to accept input signals from the crank-angle sensor, the exhaust-stream temperature sensor, the vehicle speed sensor, and the delivery signaler. Controller 122 includes non-volatile data registers, 124, 126, and 128. Register 124 registers the longest engine run time since installation or last reset of controller 122. Register 126 registers the highest vehicle speed since installation or last reset of controller 122. Register 128 registers whether a signal has been received from the delivery signaler since installation or last reset of controller 122. Controller 122 is further configured to provide a control signal to fuel injector 108, which controls an opening and closing of the fuel injector, and a control signal to fuel pump 114, which controls the fuel pressure in fuel rail 112.

It should be understood that no aspect of FIG. 1 is intended to be specifically limiting. For instance, the vehicle engine may comprise additional cylinders with additional fuel injectors and additional sensors. Controller 122 may be configured to accept input signals from the additional sensors as well, and to provide control signals to the additional fuel injectors. Further, controller 112 may be a component of a control system, with one or more additional controllers for carrying out the various actions described herein.

In this example, exhaust from cylinder 102 is discharged through exhaust valve 106, and into an exhaust system that includes exhaust-aftertreatment device 116. Exhaust-aftertreatment device 116 is configured to treat hydrocarbons and nitrogen oxide (NOX). Diesel engines may produce NOX at a significant rate by operating at high compression ratios and combustion temperatures, and with lean air-fuel mixtures. These factors, along with air-quality standards, may place high efficiency demands on exhaust-aftertreatment devices in diesel-engine vehicles. To treat NOX efficiently, exhaust-aftertreatment device 116 can be heated to above a threshold temperature, which is characteristic of the catalysts described therein. Under normal operating conditions, however, the engine exhaust may not be hot enough to provide an adequate rate of heating such that the threshold temperature is reached acceptably soon after a cold start of the engine. Thus, FIG. 2 is provided to illustrate exemplary modes of supplying additional heat to exhaust-aftertreatment device 116, to enable it to treat NOX efficiently.

Figure 2:
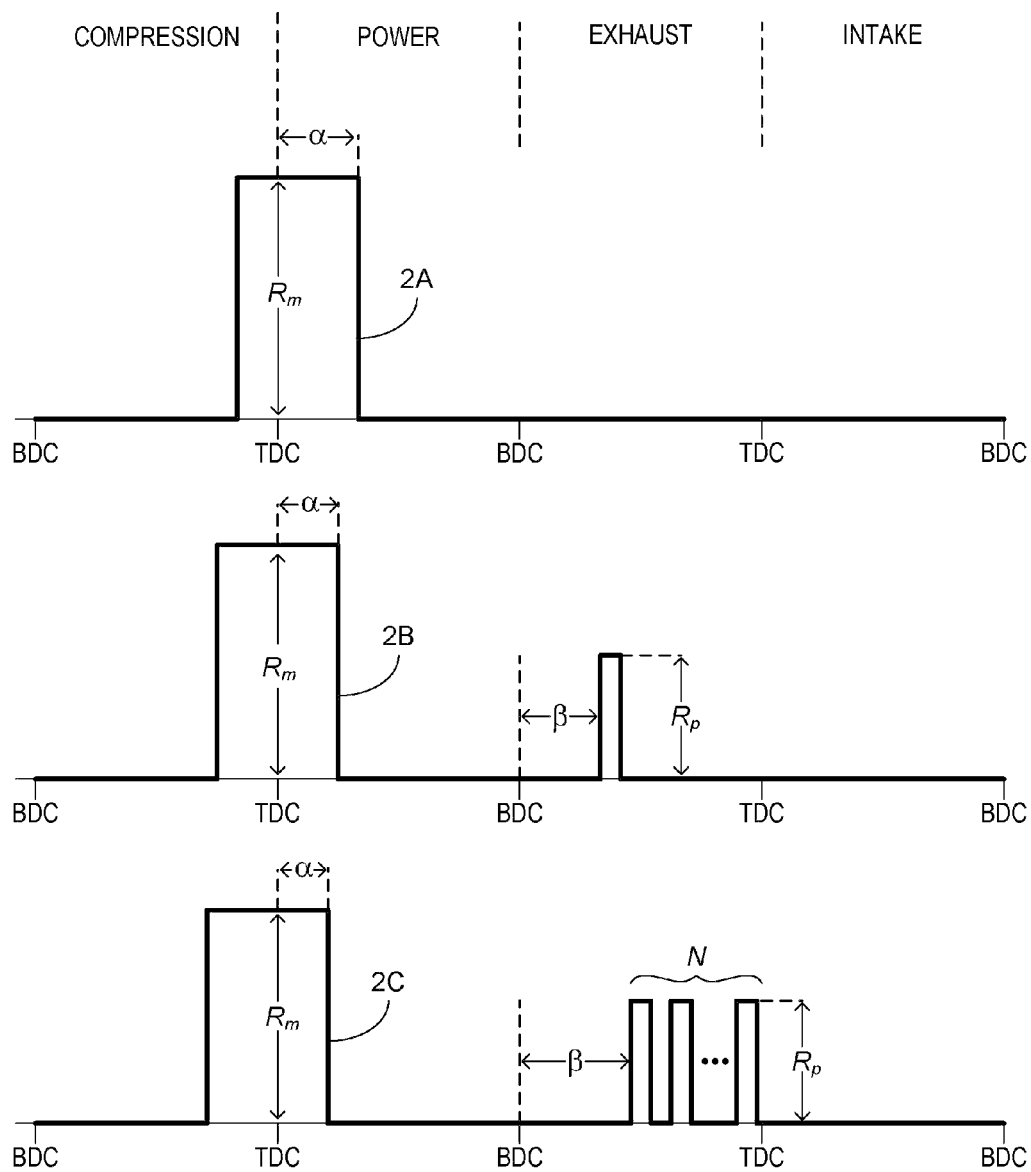
FIG. 2. shows example schedules of fuel delivery through a fuel injector of a diesel engine in accordance with the present disclosure.

FIG. 2. shows three graphs labeled 2A, 2B, and 2C. In each graph, the fuel delivery rate to a fuel injector is plotted against the crank angle as reported by a crank angle sensor. With continued numerical reference to the components of FIG. 1, each plot in FIG. 2 represents a different control signal pattern that controller 122 may provide to fuel injector 108. Equivalently, each plot represents a different schedule of fuel delivery to cylinder 102 during an engine cycle.

In Schedule 2A, the fuel injector supplies fuel to the cylinder in a main injection pulse that begins in the compression stroke and extends into the power stroke. The amplitude of the main injection pulse is indicated by the parameter $R_m$. The angle through which the main injection pulse extends into the power stroke is indicated by the parameter $\alpha$. Controller 122 may be configured to cause fuel to be supplied according to Schedule 2A over a range of parameters $R_m$ and $\alpha$. An increase in either or both of these parameters will increase the amount of fuel injected into cylinder 102 during the power stroke, which will increase the temperature of the exhaust. Therefore, by increasing the values of parameters $R_m$ and/or $\alpha$, controller 122 may be configured to increase the rate of heating of exhaust-aftertreatment device 116. Conversely, controller may be configured to decrease the rate of heating of exhaust-aftertreatment device 116 by decreasing the values of parameters $R_m$ or $\alpha$. It is further contemplated, in this example that $\alpha$ may be less than or equal to zero, in which case no fuel would be delivered to cylinder 102 during the power stroke.

In Schedule 2B, the fuel injector supplies fuel to the cylinder in two pulses: a main injection pulse that begins in the compression stroke and extends into the power stroke, and a post-injection pulse occurring within the exhaust stroke. Parameters $R_m$ and $\alpha$ have the same significance in Schedule 2B as in Schedule 2A. Further, the amplitude of the post-injection pulse is indicated by the parameter $R_p$, and the angle at which the post-injection pulse is triggered with respect to bottom dead center (BDC) of the exhaust stroke is indicated by the parameter $\beta$. Post-injected fuel may supply additional heat to exhaust-aftertreatment device 116 by prolonging combusting in cylinder 102, thereby increasing the temperature of the exhaust stream, or, more rapidly in this example, by supporting further combustion in exhaust-aftertreatment device 116. The value of parameter $\beta$ affects whether combustion of post-injected fuel will take place primarily in the cylinder or in the exhaust-aftertreatment device, with larger values of $\beta$ favoring the latter. Controller 122 may be configured to cause fuel to be supplied according to Schedule 2B over a range of parameters $R_p$ and $\beta$ in addition to parameters $R_m$ and $\alpha$. Thus, controller 122 may be configured to increase the rate of heating of exhaust-aftertreatment device 116 by increasing $R_p$ and/or $\beta$. Conversely, controller 122 may be configured to decrease the rate of heating of exhaust-aftertreatment device 116 by decreasing $R_p$ and/or $\beta$.

In Schedule 2C, the fuel injector supplies fuel to the cylinder in three or more pulses: a main injection pulse that begins in the compression stroke and extends into the power stroke, and two or more post-injection pulses occurring within the exhaust stroke. Parameters $R_m$, $\alpha$, $R_p$ and $\beta$ have the same significance in Schedule 2C as in Schedule 2B. The number of post-injection pulses is further indicated by the parameter N. Controller 122 may be configured to cause fuel to be supplied according to Schedule 2C over a range of the parameter N in addition to parameters $R_m$, $\alpha$, $R_p$ and $\beta$. Larger values of N cause more rapid heating of exhaust-aftertreatment device 116 by supplying more post-injected fuel. Thus, controller 122 may be configured to increase the rate of heating of exhaust-aftertreatment device 116 by increasing N or to decrease the rate of heating by decreasing N.

It should be understood that the three schedules shown in FIG. 2 are exemplary and non-limiting. In general, controller 122 may schedule N post-injections in M consecutive engine cycles, where M and N are non-negative integers, and M is nonzero. For example, executing Schedules 2A and 2B of FIG. 2 in alternating engine cycles would result in one post injection for every two engine cycles.

The inventors herein have recognized that injection of fuel after the power stroke may increase the rate of lubricant dilution by fuel due to cylinder bore wetting, and infer that the dilution may be most significant during pre-delivery, when series of frequent cold starts may occur prior to the lubricant reaching normal operating temperatures. Therefore, in one example, controller 122 is configured to cause fuel to be supplied according to Schedules 2B and 2C only after the pre-delivery phase is concluded. During pre-delivery, controller 122 may be configured to supply fuel according to a schedule that does not include post-injection, such as Schedule 2A. In this way, fuel may be supplied to an engine of a vehicle such that when the vehicle is in a pre-delivery state, a main injection of fuel is provided during an interval following a cold start of the engine, and, when the vehicle is not in a pre-delivery state, a main injection and a post injection of fuel are provided during an interval following a cold start of the engine. Further, the interval may depend on a temperature of an exhaust-aftertreatment device, as described in greater detail below, with reference to FIG. 4. In one specific example, the interval may include immediately after the first engine combustion and before an exhaust-aftertreatment device has reached a pre-selected activation temperature.

Accordingly, controller 122 may be further configured to determine whether the vehicle is in pre-delivery, or whether the vehicle is no longer in pre-delivery. Controller 122 may make the determination based on the data in registers 124, 126, and 128. The remaining figures provide additional details.

Figure 3:
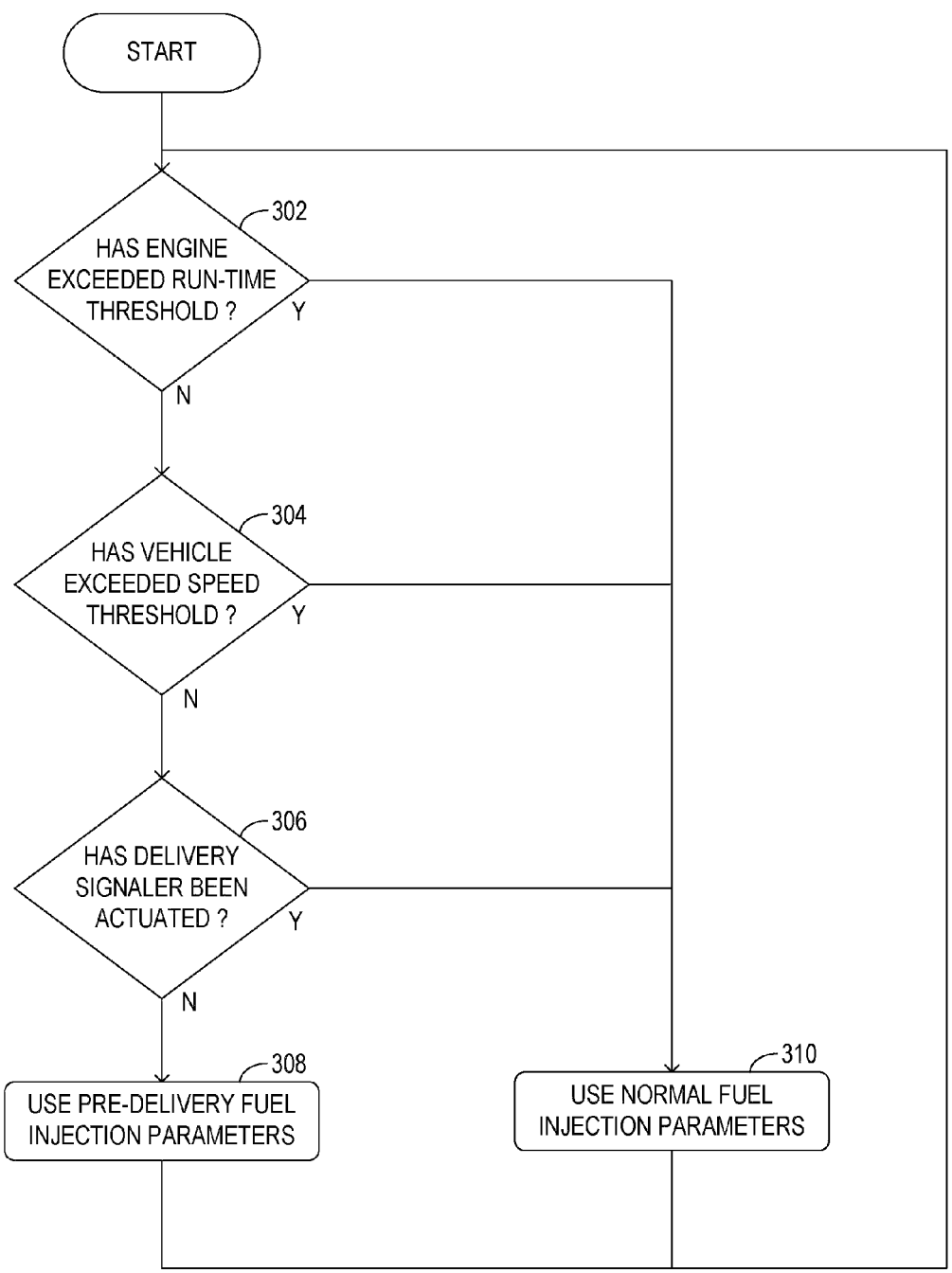
FIG. 3 is a flow chart illustrating an example algorithm by which a controller may determine whether or not the vehicle is in a pre-delivery state.

FIG. 3 illustrates an example algorithm by which a controller may determine whether or not the vehicle is in a predelivery state. With continued numerical reference to the components of FIG. 1, controller 122 at step 302 in FIG. 3 compares a longest engine run time (register 124 data) to a threshold run time, e.g., 90 minutes. At 304, the controller compares the highest vehicle speed (register 126 data) to a threshold speed, e.g., 30 miles per hour. At 306, the controller determines if delivery signaler 121 has been actuated (register 128 data). If the longest engine run time and the highest vehicle speeds are both lower than their respective thresholds, and if the delivery signaler has not been actuated, then the vehicle is assumed to be in pre-delivery. In this event, controller 112 uses, at 308, a set of pre-delivery fuel injection parameters to schedule fuel injection in cylinder 102. However, if either the engine run-time threshold or the vehicle speed threshold has been exceeded, or if delivery signaler 121 has been actuated, then the vehicle is assumed to no longer be in pre-delivery. In that event, controller 112 uses, at 310, a set of normal fuel injection parameters to schedule fuel injection in cylinder 102.

Normal and pre-delivery fuel-injection parameter sets may each include ranges of fuel-injection parameters such as $R_m$, $\alpha$, $R_p$, $\beta$, and N/M. The range of a parameter may be different in one set than in the other. For example, the maximum value of N/M, the number of post injections per engine cycle, may be smaller in the pre-delivery fuel injection parameter set than in the normal fuel injection parameter set. In one example, the maximum value of N/M in the pre-delivery fuel injection parameter set may be zero. In some examples, the maximum value of $\alpha$, the angle through which the main injection pulse extends into the power stroke, is greater in the pre-delivery fuel injection parameter set than in the normal fuel injection parameter set. Thus, a main injection pulse extending farther into the power stroke may be used to supply heat to the exhaust-aftertreatment device when post-injections are not used, as in pre-delivery.

In other embodiments, one or more of the conditions included in FIG. 3 to indicate pre-delivery may be absent from the algorithm. In still other embodiments, additional conditions may be included as appropriate for the engine or vehicle system.

Figure 4:
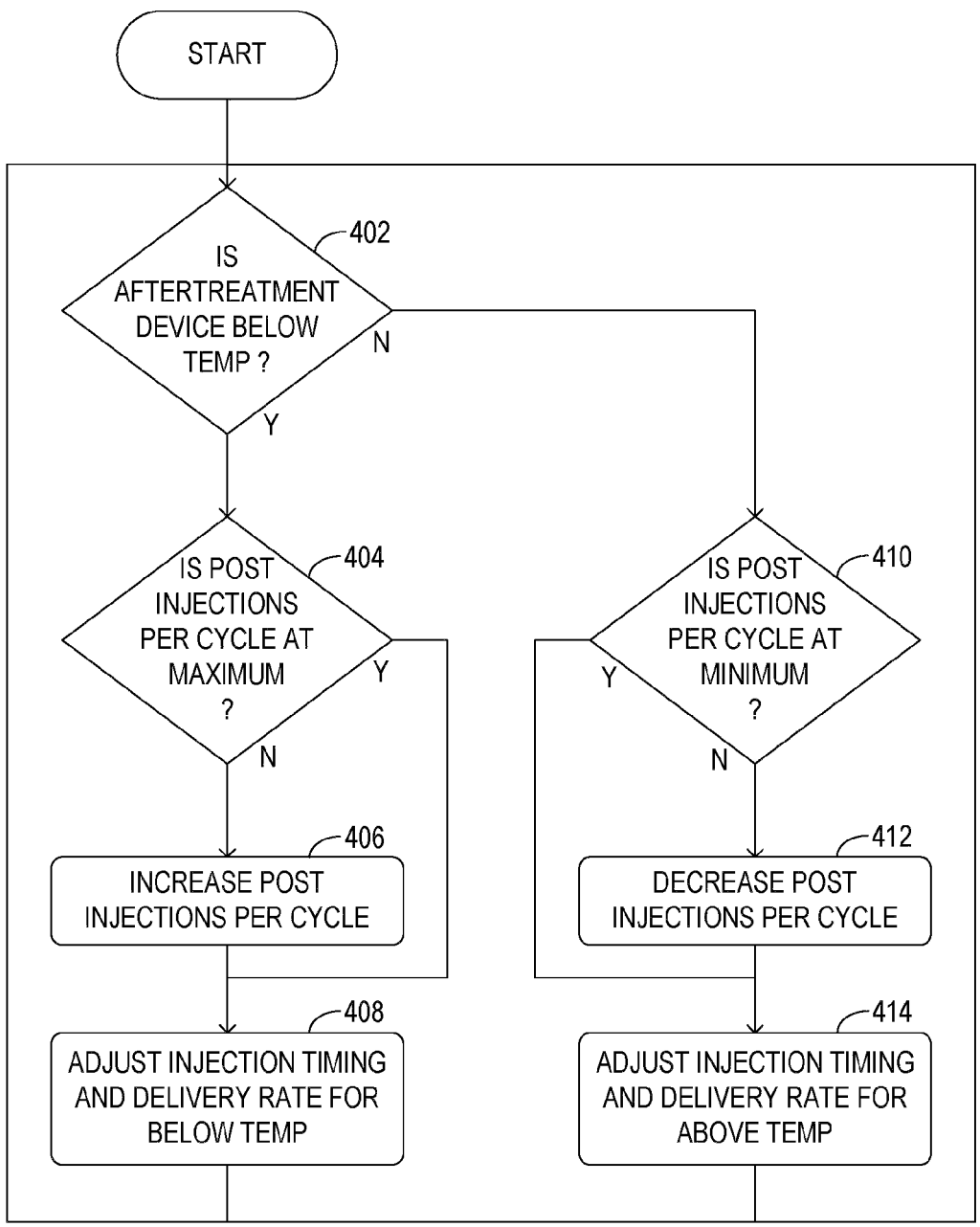
FIG. 4 is flow chart illustrating exemplary fuel-delivery scheduling according to the present disclosure.

FIG. 4 illustrates an example algorithm by which a controller may supply heat to an exhaust-aftertreatment device based on a set of fuel-injection parameters. This algorithm, described herein with continued numerical reference to the components of FIG. 1 and parameters of FIG. 2, may be executed after the algorithm of FIG. 3 has been executed at least once. In some examples this algorithm or similar algorithms may be included as steps 308 and/or 310 of FIG. 3.

At 402 of FIG. 4, controller 122 determines if exhaust-aftertreatment device 116 is below a threshold temperature. In one example, controller 122 may make the determination based on a reading of exhaust-stream temperature sensor 118. If the exhaust-aftertreatment device is determined to be below the threshold temperature, then N/M, the currently scheduled number of post injections per engine cycle, is compared at 404 to the maximum number of post injections per engine cycle in the current fuel-injection parameter set. If the N/M is less than a maximum value, then the number of post injections per engine cycle is increased, at 406. Controller 122 may affect the increase by increasing N or by decreasing M. Then, at 408, injection timing parameters such as $\alpha$ and $\beta$, and fuel injection rates such as $R_m$ and $R_p$ are adjusted as appropriate for the new value of N and M.

However, if the exhaust-aftertreatment device is determined to be above the threshold temperature, then N/M is compared, at 410, to the minimum value of post injections per engine cycle in the current fuel-injection parameter set. If N/M is greater than a minimum value, then the number of post injections per engine cycle is decreased, at 412. Controller 122 may affect the decrease by decreasing N or by increasing M. Then, at 414, injection timing parameters such as $\alpha$ and $\beta$, and fuel injection rates such as $R_m$ and $R_p$ are adjusted as appropriate for the new values of N and M.

Because minimum and maximum values of N/M are included in both the normal and pre-delivery parameter sets, and because these values may differ from one set to the other, the number of post injections per engine cycle may thus be increased and decreased within a first set of limits if the vehicle is in a pre-delivery state and within a second set of limits if the vehicle is not in a pre-delivery state, where the second set of limits may be of a greater range than the first set. In one example, therefore, controller 122 may be configured to cause fuel injector 108 to supply a main injection of fuel when the vehicle is in a predelivery state, and to supply a main injection of fuel and a post injection of fuel when a vehicle is not in a pre-delivery state and when the exhaust-aftertreatment device is below a threshold temperature.

In some embodiments, a threshold temperature may be included in the set of fuel-injection parameters. Further, the threshold temperature in the pre-delivery fuel-injection parameter set may differ from that of the normal fuel-injection parameter set. Specifically, the threshold temperature may be lower in the pre-delivery fuel-injection parameter set. Thus, controller 122 may be configured, in normal operation, to trigger post-injection of fuel when the temperature of exhaust-aftertreatment device 116 is below a normal temperature threshold; but in pre-delivery, to trigger post-injection of fuel when the temperature of the exhaust-aftertreatment device is below a lower pre-delivery threshold. In this way, lubricant dilution during pre-delivery may be reduced.

As will be appreciated, the specific routines and/or algorithms described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into computer readable storage medium in the control system.

It must be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of supplying fuel to an engine of a vehicle, the method comprising:
   modifying a schedule of direct injection of fuel into a cylinder of the engine based on whether the vehicle is in a pre-delivery state or whether the vehicle is no longer in the pre-delivery state.

2. The method of claim 1, where modifying the schedule includes reducing an amount of fuel in a post injection of fuel when the vehicle is in the pre-delivery state.

3. The method of claim 1, where modifying the schedule includes changing a timing of a post injection of fuel when the vehicle is in the pre-delivery state relative to when the vehicle is no longer in the pre-delivery state.

4. The method of claim 1, where modifying the schedule includes changing an amount of fuel in a main injection of fuel when the vehicle is in the pre-delivery state relative to when the vehicle is no longer in the pre-delivery state.

5. The method of claim 1, where modifying the schedule includes changing a timing of a main injection of fuel when the vehicle is in the pre-delivery state relative to when the vehicle is no longer in the pre-delivery state.

6. The method of claim 1, where modifying the schedule includes suppressing a post injection of fuel when the vehicle is in the pre-delivery state.

7. The method of claim 1, where the pre-delivery state prevails until the vehicle exceeds a threshold speed.

8. The method of claim 1, where the pre-delivery state prevails until the engine exceeds a threshold run time.

9. The method of claim 1, where the pre-delivery state prevails until a delivery signaler is actuated.

10. The method of claim 1, where on the schedule is modified based on a temperature of an exhaust-aftertreatment device of the vehicle.

11. The method of claim 10, where said temperature is based on a measured temperature.

12. The method of claim 1, where a number of post injections per engine cycle is increased and decreased within a first set of limits if the vehicle is in the pre-delivery state and within a second set of limits if the vehicle is not in the pre-delivery state.

13. A method of supplying fuel to a direct-injection engine of a vehicle, comprising:
   if the vehicle is in a pre-delivery state, then providing a main injection of fuel with no post injection when an exhaust-aftertreatment device of the vehicle is below a threshold temperature; and
   if the vehicle is no longer in the pre-delivery state, then providing a main injection and post injection of fuel when the exhaust-aftertreatment device is below the threshold temperature.

14. The method of claim 13, wherein the pre-delivery state prevails until a maximum speed of the vehicle exceeds a threshold speed.

15. The method of claim 13 wherein the pre-delivery state prevails until a run time of the diesel direct-injection engine exceeds a threshold time.

16. The method of claim 13 wherein the pre-delivery state prevails until a delivery signaler of the vehicle is actuated.

* * * * *